(12) United States Patent
Huang

(10) Patent No.: US 7,946,053 B2
(45) Date of Patent: May 24, 2011

(54) STRUCTURAL IMPROVEMENT OF AN ANTI-SLIP HOOK PIECE OF A MEASURING TAPE DEVICE

(75) Inventor: Jason Huang, Taipei (TW)

(73) Assignee: Index Measuring Tape Co., Ltd., Taipei (TW)

( * ) Notice: Subject to any disclaimer, the term of this patent is extended or adjusted under 35 U.S.C. 154(b) by 50 days.

(21) Appl. No.: 12/382,577

(22) Filed: Mar. 19, 2009

(65) Prior Publication Data
US 2010/0236086 A1  Sep. 23, 2010

(51) Int. Cl.
*G01B 3/10* (2006.01)
(52) U.S. Cl. .................. 33/758; 33/DIG. 1
(58) Field of Classification Search ............ 33/758, 33/DIG. 1
See application file for complete search history.

(56) References Cited

U.S. PATENT DOCUMENTS

| | | | |
|---|---|---|---|
| 2,686,366 A * | 8/1954 | Berkovic | 33/758 |
| 4,827,622 A * | 5/1989 | Makar | 33/770 |
| 5,077,911 A * | 1/1992 | von Wedemeyer | 33/770 |
| 5,600,894 A * | 2/1997 | Blackman et al. | 33/758 |
| 6,070,338 A * | 6/2000 | Garity | 33/760 |
| 6,073,983 A * | 6/2000 | Schroeder | 294/65.5 |
| 6,442,863 B1 * | 9/2002 | Poineau et al. | 33/758 |
| 6,678,967 B1 * | 1/2004 | Jueneman | 33/758 |
| 6,874,245 B2 * | 4/2005 | Liu | 33/758 |
| 7,240,439 B2 * | 7/2007 | Critelli et al. | 33/758 |
| 7,475,492 B1 * | 1/2009 | Huang | 33/758 |
| 2003/0070315 A1 * | 4/2003 | Bergeron | 33/770 |
| 2006/0283036 A1 * | 12/2006 | Huang | 33/758 |

* cited by examiner

*Primary Examiner* — Christopher W Fulton
(74) *Attorney, Agent, or Firm* — Bacon & Thomas, PLLC

(57) ABSTRACT

A measuring tape device has a hook piece. The hook piece is used for preventing the tape from slipping off from an object of measure. The hook piece consists of a hook body and an anti-slip piece; the hook body consists of a pulling part and a connecting part; the pulling part is a flat surface, the connecting part extends out from one side of the pulling part in the direction that is perpendicular to the pulling part; the anti-slip piece is adhered onto the inside surface of the pulling part; and magnetic pieces are attached to the outside surface of the pulling part. Therefore, during the measuring process, both the anti-slip piece and the magnetic pieces may help keeping the hook plate of the measuring tape attaching to the object of measure and hence the tape does not slip off from the object of measure easily.

8 Claims, 5 Drawing Sheets

STRUCTURAL IMPROVEMENT OF AN ANTI-SLIP HOOK PIECE OF A MEASURING TAPE DEVICE

BACKGROUND OF THE INVENTION

1. Field of the Invention

The present invention relates to an improvement of measuring tape device, in particular, it refers to the hook piece that is designed to prevent the hook piece from slipping off from the object of measure.

2. Description of Prior Art

With the increasing demand of surveying, the measuring tape devices get to be more widely used. A conventional measuring tape device, as shown in FIG. 1, comprises of a casing 11; a hollow space (not shown) is formed within the casing, which holds a bobbin 12; at the center of the casing 11 is the bobbin 12 that is connected to the casing 11 with a coil spring (not shown). A measuring tape 13 is contained inside the casing 11, one end of the measuring tape 13 is connected to the spring and it is wound around the bobbin 12, and the other end of the tape 13 extends outside of the casing 11 through an aperture. A hook plate 14 is attached at the end of the measuring tape.

This type of conventional measuring tape device comes with a locking mechanism 16; the locking mechanism is to lock in place the part of the measuring tape 13 that extends outside the casing 11. During the process of taking measurement, the measuring tape 13 is pulled away from outside of the casing 11, then the extended tape 13 is locked in place using the device's locking mechanism 16, and the measure can be read from the tape 13, as such, the length of the object of measure is obtained. The locking mechanism 16 is released after the measurement is taken, and the tape 13 is immediately retracted back into the casing 11.

FIG. 2 shows a hook plate 14 of a conventional measuring tape device, the hook plate consists of a hook body 20 and an anti-slip piece 23, wherein a pulling piece 21 and a connecting piece 22 form the hook body 20. As shown in FIG. 2, the pulling piece 21 is perpendicular to the connecting piece 22 that is attached to the tape 13, as such, by pulling the pulling piece 21, the tape 13 can be pulled outside of the casing. Surface 24 of the pulling piece 21 is the surface faces towards tape 13 and surface 25 is the surface faces away from the tape 13, an anti-slip piece 23 is placed onto surface 24.

The connecting piece 22 of the hook body 20 and the tape 13 is placed against each other in parallel, one end of the connecting piece is attached to the end of tape 13.

During production of hook plate 14, the pulling piece 21 and the connecting piece 22 is conformed into one piece, then adhesive is spread onto the surface 24 of the pulling piece, the anti-slip piece 23 is then adhered onto the surface 24 of the pulling piece 21.

However, since the design of pulling piece 21 of conventional hook plate 14 is a flat and plain surface, and the anti-slip piece 23 is directly adhered onto the surface 24 of the pulling piece 21, when the measuring tape is used extensively, it may cause the anti-slip piece 23 to be easily come apart from the surface 24 of the pulling piece 21, therefore, this design may not be suitable for the durability of the measuring tape. Besides, during the production process of the hook plate 14, the adhesive material that is spread onto the surface 24 may easily be spilled over the flat edges of the pulling piece 21 causing excessive use of adhesive material, and as a result increases costs of producing hook plate 14.

SUMMARY OF THE INVENTION

The main objective of present invention is to provide for an anti-slip hook piece, on a hook plate of a measuring tape device, which does not easily come apart from the pulling piece of a measuring tape.

For the present invention, not only that the anti-slip piece does not easily come apart from the pulling piece, but the pulling piece also has a magnetic piece that may pull the object of measure, and therefore the other objective of present invention is the conduciveness to the measuring process.

To accomplish the above objectives, the hook plate of present invention consists of a hook body and an anti-slip piece, wherein the hook body consists of a pulling part and a connecting part; the pulling part has a primary surface, there are three slightly extruded edges surrounding the primary surface and these edges are perpendicular to the primary surface; at the upper end of the pulling part, the connecting part extends and is perpendicular to the pulling part, and the anti-slip piece of the hook plate is adhered onto the primary surface of the pulling part; furthermore, a group of magnetic pieces are attached between anti-slip piece and pulling part, as such, the anti-slip piece is adhered onto the primary surface of the pulling part, the slightly extruded edges surrounding the primary surface give boundary and resistance to the movement of the anti-slip piece, such that it prevent the anti-slip piece from coming apart from the primary surface of the pulling part.

During application, it is beneficial to produce the anti-slip piece to be higher than the surrounding edges. Therefore, during measuring process, the anti-slip piece of the hook plate can be used to hold onto the surface of the object of measure without the edges come in direct contact with the surface of the object of measure. This strengthens the grip of hook plate when it is used to hold onto the object of measure.

To realize the above objectives, the measuring tape device of present invention consists of a casing that holds a tape, a bobbin that is contained within the casing and it is connected to the casing with a spring, the tape that is contained inside the casing has one end connected to a spring and the tape is wound around the bobbin within the casing, the other end of the tape extends outside through the aperture that is located on the lower end of casing, and the tape is connected to a hook plate, the hook plate consists of a hook body and an anti-slip piece, wherein the hook body consists of a pulling part and a connecting part, the pulling part has a primary surface, at the upper end of the pulling part, the connecting part extends in perpendicular to the pulling part, the anti-slip piece is adhered onto the primary surface of the pulling part, furthermore, there are three slightly extruded edges surrounding the primary surface and these edges are perpendicular to the primary surface of the pulling part.

With the above designed, during production of the hook plate, three slightly extruded edges surrounding the primary surface of the pulling part are able to effectively prevent spill-over of the adhesive material and thus help avoid wasteful use of adhesive material during production. In addition, the extruded edges act as boundary and resistance in preventing movement of the anti-slip piece that is adhered onto the pulling part, hence the anti-slip piece can be securely fixated onto the surface of the pulling part.

Furthermore, with a group of magnetic pieces attached to the inner surface of the pulling part, not only that the anti-slip piece of the measuring tape device may be able to latch onto the vertical surface of object of measure, but the magnetic pieces of the measuring tape device also allows for additional tape securing that enhances convenience during measurement.

DETAILED DESCRIPTION OF THE PREFERRED EMBODIMENTS

Figure 1:
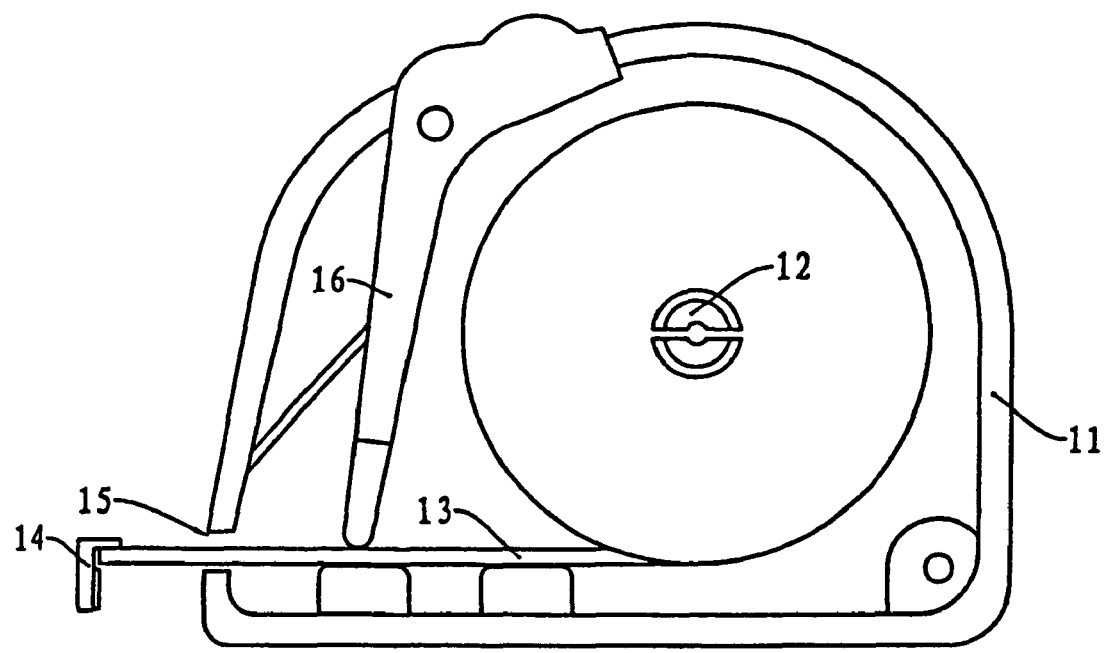
FIG. 1 is an illustrative view showing the construction of a conventional measuring tape device.
Figure 2:
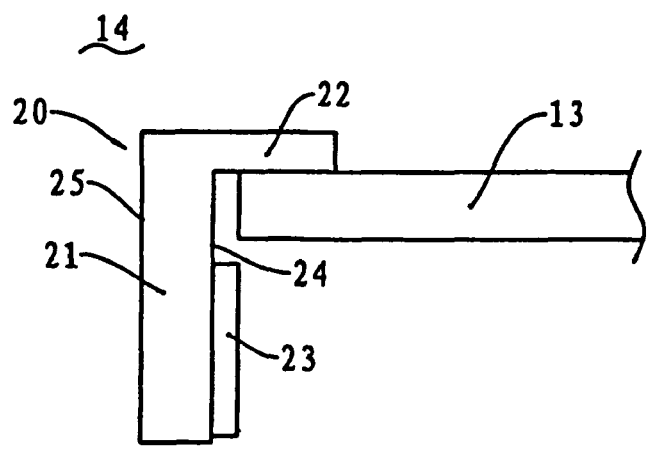
FIG. 2 is an exploded view showing the construction of a conventional hook piece having anti-slip function, wherein it shows that the hook piece is attached to the measuring tape.
Figure 3:
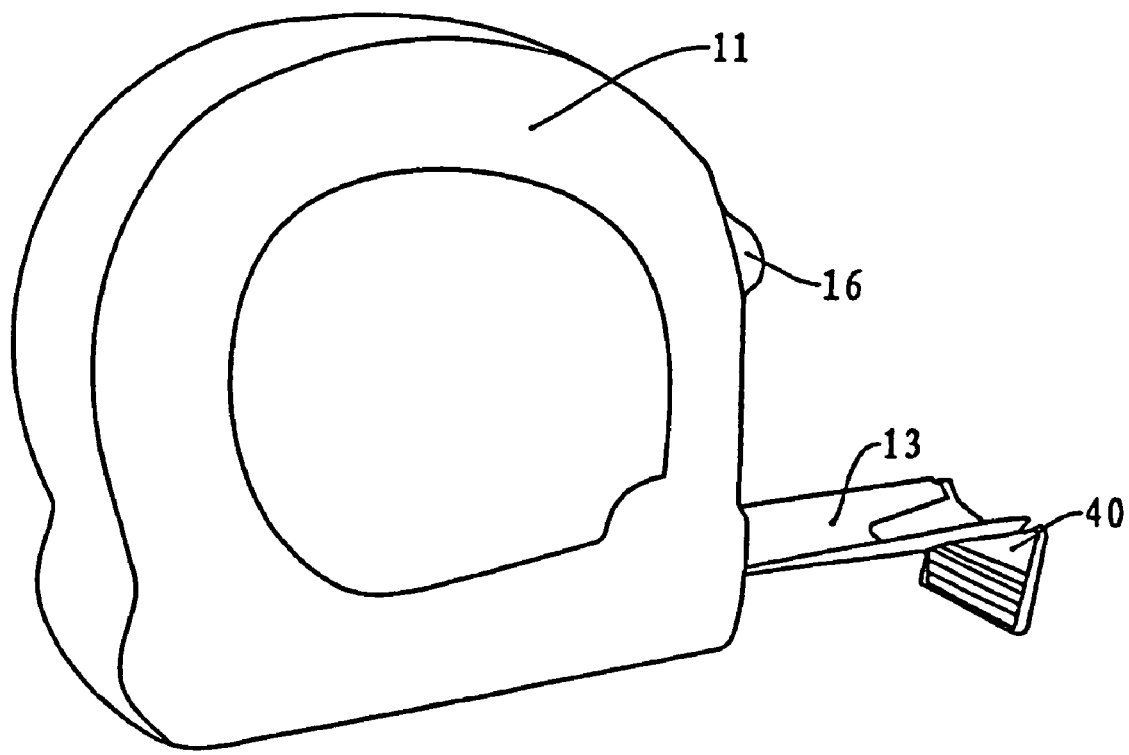
FIG. 3 is a constructional view showing the measuring tape device of present invention.

The measuring tape device of present invention, as shown in FIG. 3, is mostly the same as conventional measuring tape device on the market. The present invention consists of a casing 11, wherein a bobbin (not shown) is contained at the center within the casing 11 and it is connected to the casing 11 with a coil spring (not shown). There is a measuring tape 13 contained inside the casing 11, one end of the measuring tape 13 is connected to a spring (not shown) and it is wound around the bobbin. The other end of the tape 13 extends outside of the casing 11 through an aperture that is located at the lower end of the casing and is connected to a hook plate 40. The measuring tape device comes with a locking mechanism 16, with which one may lock part of the tape 13 in place when taking measurement and thus one may easily read the measure off the tape 13.

Figure 4:
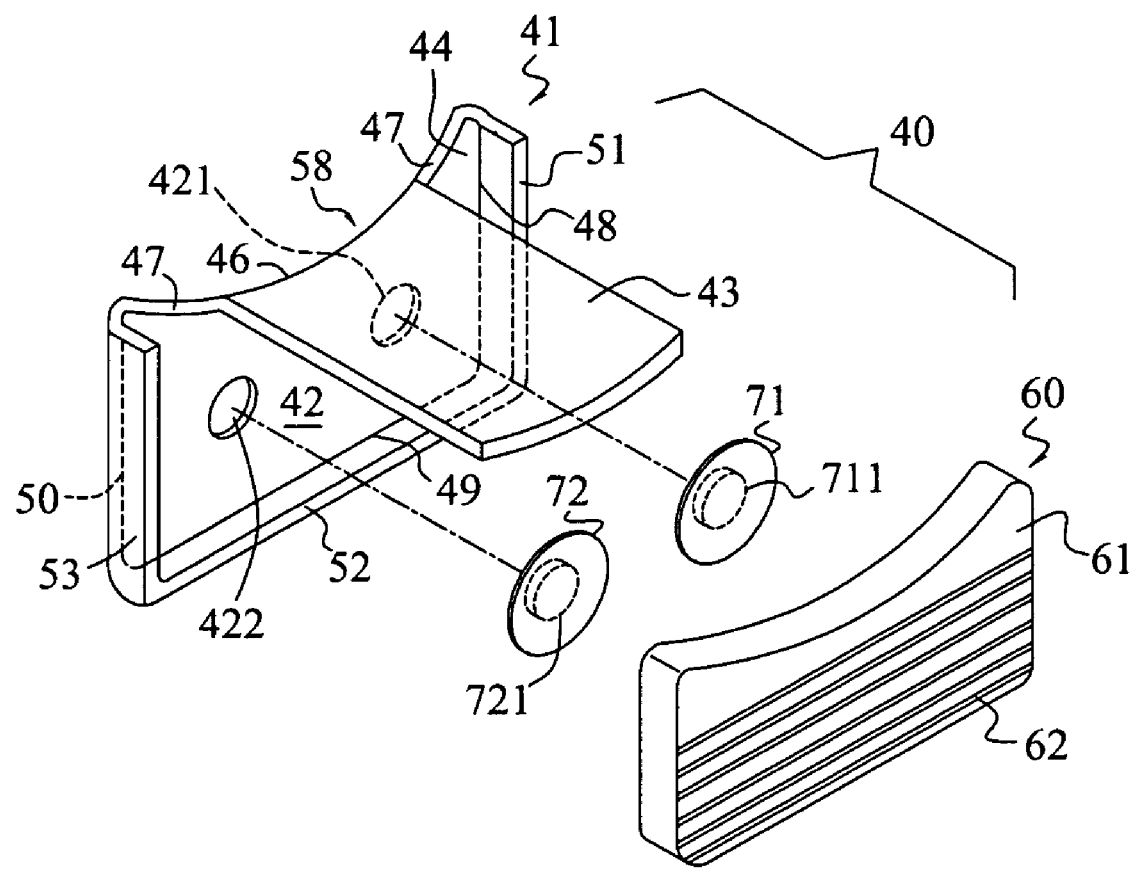
FIG. 4 is an exploded view showing the three-dimensional construction of the hook piece of present invention having the anti-slip function.

As shown in FIG. 4, the said hook plate 40 comprises of a hook body 41 and an anti-slip piece 60, the hook body 41 consists of a pulling part 42 and a connecting part 43, both of which are conformed into one piece.

Figure 5:
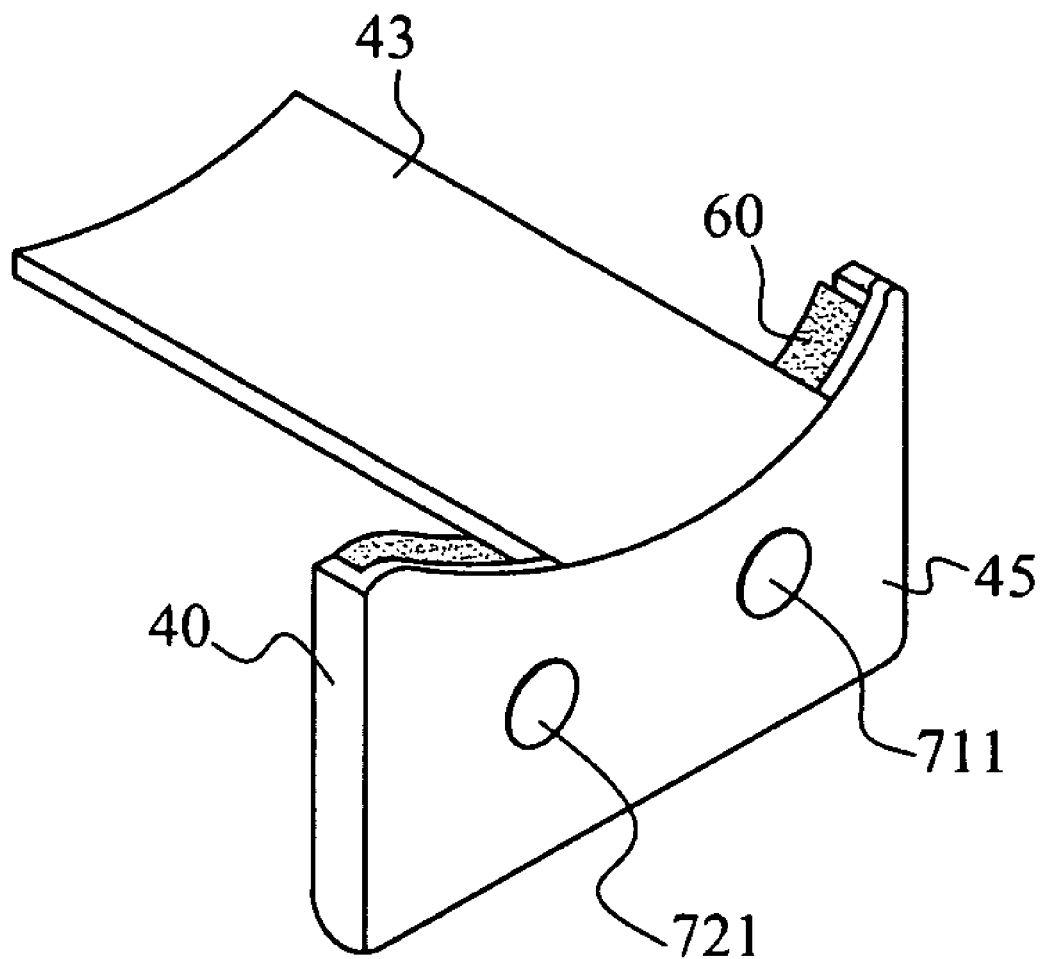
FIG. 5 is a three-dimensional illustrative view showing the hook piece of present invention having the anti-slip function and the magnetic pieces installed.

The pulling part 42 has a primary surface 44 that faces the same direction as the connecting part 43. The pulling part 42 is a flat surface that has 4 sides, which includes first side 58, second side 48, third side 49, and the forth side 50; wherein the first side 58, the second side 48, the third side 49 and the forth side 50 are clock-wisely conjoined, and together the sides shape the pulling part 42 into a trapezoidal shape. Furthermore, there are two holes 421, 422 that are set on the main body of the pulling part 42 to allow for two magnetic pieces 71, 72 to be assembled onto the main body of the puling part 42; at the inner surface of the magnetic pieces 71, 72 form extruded plug 711, 721, the plugs and the magnetic pieces are conformed in one piece and the plugs have diameters slightly smaller than the holes 421, 422 on the main body of the pulling part 42, the plugs of the magnetic pieces are then inserted into the holes 42 1, 422 from the inner surface of the main body of the pulling part 42. As the plugs 711, 721 are inserted into the holes 421, 422, the front end of the plugs is slightly extruded outward at the outer surface of the pulling part 42, such that the object of measure can be magnetized against the hook piece of the measuring tape device with the front end of the plugs; and, after the magnetic pieces 71, 72 are embedded in position, the anti-slip piece 60 is conjoined with the pulling part 42 (as shown in FIG. 5);

As shown in FIG. 4, the connecting part 43 is located in perpendicular to the pulling part 42, one end of the connecting part is connected to the middle of the first edge 58 of the pulling part 42, which forms the joint 46, and therefore the connecting part 43 and the pulling part 42 are conformed into one piece, in effect, the connecting part 43 and the pulling part 42 may be molded as one piece. The other end of the connecting part 43 is attached to the measuring tape 13, and this allows users to extract tape 13 when pulling the pulling part 42.

As shown in FIG. 4, at the second side 48 of the pulling part 42, there is an edge 51 that is extruded perpendicular to the primary surface 44, to be precise, the edge 51 and the primary surface 44 forms a 90-degree angle. In the direction perpendicular to primary surface 44 of the pulling part 42, the upper part of edge 51 is higher than the primary surface 44 of the pulling part 42. Edge 51 and the pulling part 42 are conformed into one piece.

Figure 6:
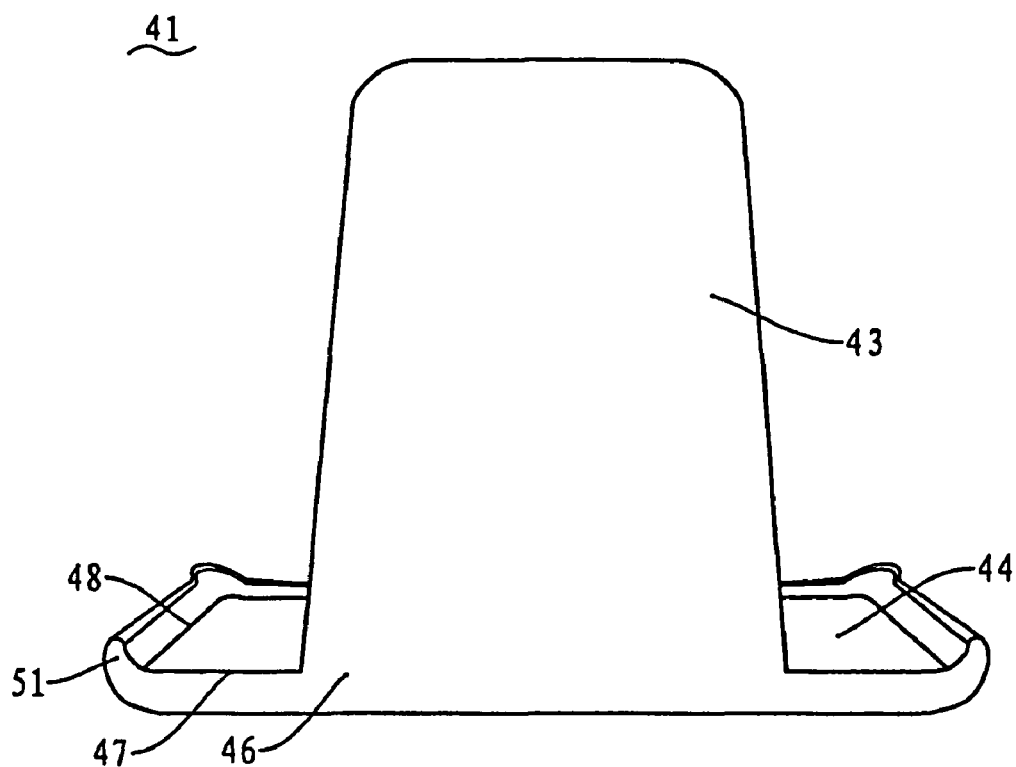
FIG. 6 is an enlarged exploded view showing the construction of the body of the anti-slip hook piece of present invention.
Figure 7:
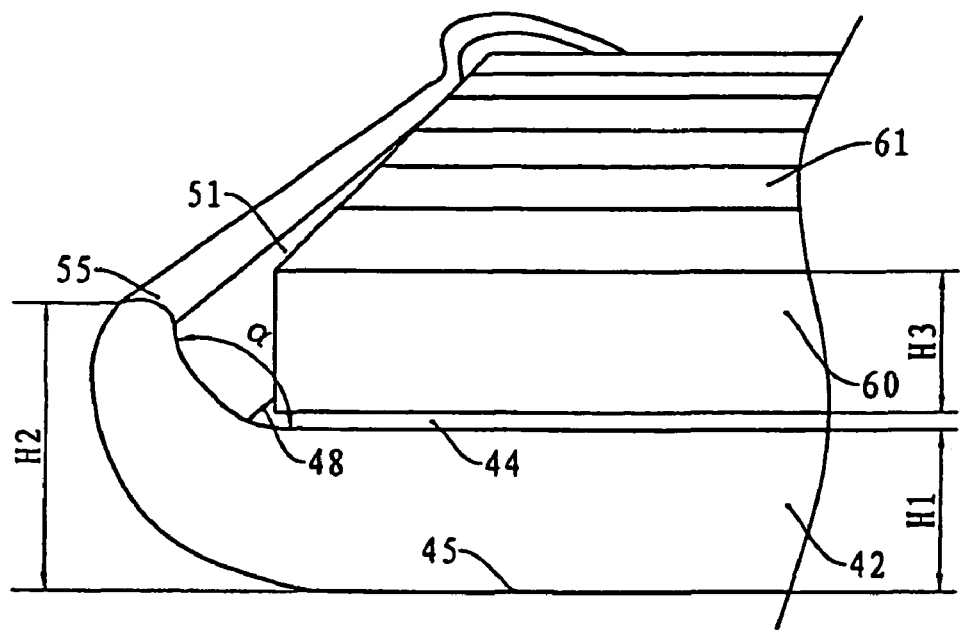
FIG. 7 is an enlarged exploded view showing part of the anti-slip hook piece of present invention.

In reference to FIG. 6 and FIG. 7, in the direction perpendicular to the primary surface 44 of the pulling part 42, the thickness of pulling part 42 is represented by H1, i.e. the distance between the primary surface 44 and the outer surface 45 is H1. The distance between the edge 51 and the outer surface 45 of the pulling part 42 is represented by H2, as shown in FIG. 7, the measure of H2 is greater than H1, i.e. the distance between the upper part 55 of the edge 51 and the outer surface 45 of the pulling part 42 is greater than the thickness of the pulling part 42. Ideally, the measure of H2 is to be less than five times of H1, i.e. the distance between the upper part 55 of the edge 51 and the outer surface 45 of the pulling part is to be less than five times the thickness of the pulling part 42.

Referencing again to FIG. 4, each of the third side 49 and the forth side 50 of the pulling part 42 has an edge 52, 53 respectively, and the edges 52, 53 each extrudes in perpendicular to the primary surface 44 and each of which is set higher than the primary surface 44.

In addition, the hook plate 40 includes an anti-slip piece 60 that is made of material such as resin; the anti-slip piece 60 is adhered onto the primary surface 44 of the pulling part 42. The outward facing surface 61 of the anti-slip piece 60 is marked with multiple grooves, so that it allows users attach the anti-slip piece 60 against the surfaces of the objects of measure.

As shown in FIG. 7, when the anti-slip piece 60 is adhered onto the primary surface 44 of the pulling part 42, the thickness of the anti-slip piece 60 is represented by H3, i.e. the distance between the outward facing surface 61 of the anti-slip piece 60 and the primary surface 44 of the pulling part 42 is H3.

For the present embodiment, in the direction perpendicular to the primary surface 44 of the pulling part 42, the outward facing surface 61 of the anti-slip piece 60 is higher than the upper part 55 of the edge 51, i.e. the sum of H3 and H1 is greater than H2.

Ideally, the thickness of the pulling part 42, H1, is between 0.5 mm and 4 mm; the distance between the upper part 55 of the edge 51 and the outer surface 45 of the pulling part 42, H2, is between 0.8 mm and 7 mm; and the thickness of the anti-slip piece 60, H3, is between 0.4 mm and 3.1 mm. With proper adherence to the above scale, the hooking strength of the pulling part 42 of the hook plate may be ensured, and at the same time the weight of the hook plate 40 does not add burden to the tape 13 during measurement.

In design, the angle between the edge 51 and the primary surface 44 of the pulling part 42 is an obtuse angle, which is to be between 95° and 100°. Yet in application, the angle can alternatively be an acute angle.

In practice, there are extruded edges 51, 52, 53 correspond to each of the second side 48, third side 49 and forth side 50 of the pulling part 42 respectively, and there is no absolute need for extruded edges for the two outside edges 47 on the conjoining edge 46 on the first side 58, this simplifies the making of the hook body 41. However, if so choose, there can be edges set to the two outside edges 47 of the first side 58, in which case, all sides of the pulling part 42 have extruded edges.

Therefore, having the edges at all sides of the pulling part 42 higher than the primary surface 44 of the pulling part 42 (in the direction that is perpendicular to the primary surface 44 of the pulling part 42), the anti-slip piece 60 that is adhered onto the primary surface 44 of the pulling part 42 does not come apart easily from the pulling part 42; and with the help of the plugs 711, 721 of the magnetic pieces 71, 72, which extrudes outward at the outside surface of the pulling part 42, the plugs can be used to magnetize against the objects of measure, the durability of the measuring tape device is enhanced.

During production of the measuring tape device, adhesive material is spread onto the primary surface 44 of the pulling part 42, by having the edges extruded out at the sides of the pulling part 42, it creates a blockage that prevents the adhesive material from spilling over of the pulling part 42, therefore, it not only benefits the production of the hook plate 40, but it also helps reduce wasteful use of adhesive material.

Furthermore, the extruded edges at the sides of the pulling part 42 provide boundary and resistance so to lock the anti-slip piece 60 in position, therefore, it not only brings convenience to the assembly of the anti-slip piece 60 onto the surface 44 of the pulling part 42; but it also simplifies the production process of the measuring tape device.

The above demonstration is only a preferred embodiment, there can be numerous variations in practice, for example, the edges may be limited to only the second side and the forth side; the distance between the upper part of the edge and the surface of the pulling part may be varied; the thickness of the anti-slip piece may be varied, etc., the above variations do not avert the accomplishment of the objectives of present invention.

It is to be emphasized that present invention is not limited to the embodiments described in the above examples, variations such as changing shape of the pulling part of the hook plate; changing number of extruded edges on the sides of the pulling part; changing material used for the anti-slip piece, etc., may be made without causing departure from the spirit of present invention.

What is claimed is:

1. A measuring tape device including a hook piece having an anti-slip function, the measuring tape device comprising:
    a casing, a bobbin disposed inside the casing, the bobbin being connected to the casing with a spring;
    a measuring tape contained within the casing, one end of the tape being connected to a spring and wound around the bobbin, the other end of the tape extending outside the casing and being connected to a hook piece;
    the hook piece including a hook body, the hook body comprising:
        a pulling part having a primary surface, an outer surface and a first upper side, the first upper side having a concave surface;
        a connecting part extending out from one side of the pulling part in a direction that is perpendicular to the pulling part;
        an anti-slip piece adhered to the primary surface of the pulling part, the anti-slip piece having an upper concave surface corresponding to the concave surface of the first upper side of the pulling part;
        wherein the pulling part has three other sides connected to the primary surface and each of the three other sides has an extruded edge that protrudes from the primary surface.

2. A measuring tape device as claimed in claim 1, wherein after being adhered onto the primary surface of the pulling part, the outward facing surface of the anti-slip piece is higher than the edges surrounding the sides of the pulling part.

3. A measuring tape device as claimed in claim 2, wherein the pulling part has holes that penetrate both the primary surface and the outer surface of the pulling part; a set of magnetic pieces are embedded in between the pulling part and the anti-slip piece, at the front end of the magnetic piece is a set of plugs that have diameter slightly smaller than the holes of the main body of the pulling part and that are to be inserted into the holes of the main body of the pulling part, the plugs are slightly extruded outward at the outer surface of the pulling part after the plugs are inserted in place.

4. A measuring tape device as claimed in claim 1, wherein the angle between the edge of the pulling part and the primary surface of the pulling part can be at a right angle or at an obtuse angle.

5. A measuring tape device as claimed in claim 4, wherein the pulling part has holes that penetrate both the primary surface and the outer surface of the pulling part; a set of magnetic pieces are embedded in between the pulling part and the anti-slip piece, at the front end of the magnetic piece is a set of plugs that have diameter slightly smaller than the holes of the main body of the pulling part and that are to be inserted into the holes of the main body of the pulling part, the plugs are slightly extruded outward at the outer surface of the pulling part after the plugs are inserted in place.

6. A measuring tape device as claimed in claim 1, wherein the distance between the upper part of the edge of the pulling part and the outer surface of the pulling part is less than five times the thickness of the pulling part.

7. A measuring tape device as claimed in claim 6, wherein the pulling part has holes that penetrate both the primary surface and the outer surface of the pulling part; a set of magnetic pieces are embedded in between the pulling part and the anti-slip piece, at the front end of the magnetic piece is a set of plugs that have diameter slightly smaller than the holes of the main body of the pulling part and that are to be inserted into the holes of the main body of the pulling part, the plugs are slightly extruded outward at the outer surface of the pulling part after the plugs are inserted in place.

8. A measuring tape device as claimed in claim 1, wherein the pulling part has holes that penetrate both the primary surface and the outer surface of the pulling part; a set of magnetic pieces are embedded in between the pulling part and the anti-slip piece, at the front end of the magnetic piece is a set of plugs that have diameter slightly smaller than the holes of the main body of the pulling part and that are to be inserted into the holes of the main body of the pulling part, the plugs are slightly extruded outward at the outer surface of the pulling part after the plugs are inserted in place.

* * * * *